(12) United States Patent
Tsui et al.

(10) Patent No.: US 8,786,246 B2
(45) Date of Patent: Jul. 22, 2014

(54) POWER RESOURCE MANAGEMENT

(75) Inventors: Chi Ying Tsui, Hong Kong (CN); Ross David Murch, Hong Kong (CN); Roger Shu Kwan Cheng, Hong Kong (CN); Wai Ho Mow, Hong Kong (CN); Vincent Kin Nang Lau, Hong Kong (CN)

(73) Assignee: Tuen Solutions Limited Liability Company, Wilmington, DE (US)

( * ) Notice: Subject to any disclaimer, the term of this patent is extended or adjusted under 35 U.S.C. 154(b) by 1095 days.

(21) Appl. No.: 12/053,861

(22) Filed: Mar. 24, 2008

(65) Prior Publication Data
US 2008/0246439 A1    Oct. 9, 2008

Related U.S. Application Data

(60) Provisional application No. 60/910,109, filed on Apr. 4, 2007.

(51) Int. Cl.
*H02J 7/00* (2006.01)
*H01M 10/44* (2006.01)
*H01M 10/46* (2006.01)

(52) U.S. Cl.
USPC ............ 320/101; 320/103; 320/112; 320/114

(58) Field of Classification Search
USPC .................................. 320/101, 103, 112, 114
See application file for complete search history.

(56) References Cited

U.S. PATENT DOCUMENTS

| | | | |
|---|---|---|---|
| 5,420,496 A * | 5/1995 | Ishikawa | 320/106 |
| 5,555,490 A | 9/1996 | Carroll | |
| 5,774,338 A | 6/1998 | Wessling, III | |
| 5,963,012 A * | 10/1999 | Garcia et al. | 320/106 |
| 6,225,799 B1 * | 5/2001 | Gergel et al. | 324/212 |
| 6,281,594 B1 * | 8/2001 | Sarich | 290/1 R |
| 6,466,232 B1 | 10/2002 | Newell et al. | |
| 6,470,212 B1 * | 10/2002 | Weijand et al. | 607/35 |
| 6,801,140 B2 | 10/2004 | Mantyjarvl et al. | |
| 6,822,343 B2 * | 11/2004 | Estevez | 290/1 R |
| 6,870,089 B1 * | 3/2005 | Gray | 136/251 |
| 7,003,353 B1 * | 2/2006 | Parkhouse | 607/45 |
| 7,019,492 B1 * | 3/2006 | Baker et al. | 320/114 |
| 7,167,920 B2 | 1/2007 | Traverstat et al. | |
| 2002/0028704 A1 | 3/2002 | Bloomfield et al. | |
| 2002/0123337 A1 | 9/2002 | Dharia et al. | |
| 2004/0088347 A1 | 5/2004 | Yeager et al. | |
| 2005/0258717 A1 * | 11/2005 | Mullen | 310/339 |
| 2006/0125446 A1 * | 6/2006 | Tupman et al. | 320/132 |
| 2007/0210758 A1 * | 9/2007 | Gangstoe et al. | 320/134 |

OTHER PUBLICATIONS

International Search Report and Written Opinion, dated Aug. 19, 2008, PCT application No. PCT/US08/59036, 10 pages.
International Search Report and Written Opinion, dated Aug. 22, 2008, PCT application No. PCT/US08/59026, 10 pages.

\* cited by examiner

*Primary Examiner* — Samuel Berhanu
(74) *Attorney, Agent, or Firm* — Amin, Turocy & Watson, LLP

(57) ABSTRACT

Systems and methods that recharge power supply units of portable electronic devices by leveraging energy harvesting or scavenging techniques. A recharge component accumulates energy from a plurality of sources, and supplies an electric current to the portable electronic device for a charge thereof. The sources of energy are based on routine user actions such as muscle movements (e.g., walking, movement of eye lashes, body heat), and can further consider environmental factors such as exposure to sunlight, temperature, as well as availability of external power sources.

37 Claims, 10 Drawing Sheets

POWER RESOURCE MANAGEMENT

CROSS-REFERENCE TO RELATED APPLICATIONS

This application claims the benefit of U.S. Provisional Patent application Ser. No. 60/910,109 entitled "ADVANCEMENTS FOR WIRELESS DEVICES AND WIRELESS COMMUNICATIONS" filed on Apr. 4, 2007, which is assigned to the assignee hereof, and hereby expressly incorporated by reference herein.

TECHNICAL FIELD

The subject innovation relates to charging energy storage components of portable units, and more particularly to systems method for power management in a portable electronic device via energy harvesting processes.

BACKGROUND

Portable electronic devices typically include a rechargeable or alkaline battery to supply power to the portable device. Reducing size of such electronic units and simultaneously lowering associated costs remains a primary design factor. For example, many such electronic units, such as portable or hand held electronic devices, e.g., cellular phones, laptop computers, bar code scanners and the like can include various replaceable battery arrangements or rechargeable battery packs comprised of battery cells.

Generally, when one battery unit or a battery cell of such a pack is depleted, it can be removed from the host unit and replaced with another fully charged battery cell, with the depleted battery unit or cell being recharged or disposed of. Such battery pack arrangement can typically include a sealed enclosure, which protects the rechargeable batteries cells. Contacts on an exterior surface of the battery pack enclosure mate with contacts on the electronic device or interior terminal contact, upon the battery pack being mounted on the electronic device.

Desirable characteristics of a rechargeable power supply for such units, as well as for other portable electronic units, include; lightness, rapid charging rate, performance at low charge, ability to be charged and discharged many times without deterioration, and calendar lifetime. However, typically providing a long battery life for portable electronic units substantially increases weight of the portable unit, such that they become heavy and cumber some to operate.

SUMMARY

The following presents a simplified summary in order to provide a basic understanding of the described aspects. This summary is not an extensive overview and is intended to neither identify key or critical elements nor delineate the scope of such aspects. Its purpose is to present some concepts of the described aspects in a simplified form as a prelude to the more detailed description that is presented later.

The subject innovation recharges power supply units(s) of a portable electronic device via employing a recharge component, which leverages energy harvesting or scavenging techniques associated with available energy sources to provide power based on a user's day-to-day activities. Such day-to-day activities can pertain to routine user actions such as muscle movements (e.g., walking, movement of eye lashes), body heat, and can further consider environmental factors such as exposure to sunlight, temperature, and the like that can be additionally employed to supply sources of energy for the recharge component. Sensors attached to various parts of a user's body can accumulate and/or convert mechanical energy to electric current for recharging the power supply via the recharge component of the subject innovation. For example, various configuration of wires (e.g., on a nanoscale) can supply a contact based interface from the recharge component to the power supply, for a continuous charge thereof.

In a related aspect, the recharge component can further include a regulator component that controls functions of the portable unit, to minimize a power consumption thereof. For example, the regulator component can adjust size of a screen output, and further minimize usage of associated transceiver units when the battery power drops below a predetermined threshold. Accordingly, the subject innovation can further manage a supply of power to the portable electronic device based on its state of operation, e.g., if power is low, the mobile device can halt a simultaneous display of multiple video feeds via a split screen—since such operation is power intensive.

According to a further aspect, the recharge component and/or the power supply of the portable unit can be wearable by a user (e.g., positioned in a user's belt or shoe, or wrist.) Such power supply can further be charged through an interface with an external power supply, during different user positions (e.g., when a user is sitting during rest time). Moreover, the interface can enable charge through contact (e.g., direct wiring), or can further supply a contact-free recharge operation (e.g., inductive coupling.) Additionally, a spreading assembly of piezoelectric elements can be employed at the sole of the shoe, to convert the applied stress/strain into electrical current.

The piezoelectric elements can be fabricated from any piezoelectric material that can convert mechanical energy (e.g., shock force) into an electric field. Such material can for example include a variety of ceramics with a perovskite structure quartz, barium titanate, lead niobate, lead zirconate titanate, and the like. It is to be appreciated that various electronic circuitry and components can be embedded into the spreading assembly of the piezoelectric component in a variety of planar or three dimensional arrangements to gather, monitor, regulate and over all manage voltage or current formation therein.

In a related methodology, the recharge component of the subject innovation determines that the power supply for the mobile unit requires to be charged. Such determination can be in real-time, and/or can occur in response to a request by the regulator component of the charging system; or at a user's discretion. A triggering event can then initiate activation of a charge session for the power supply. For example, a predetermined triggering event can be defined (e.g. a threshold power storage value) to initiate recharge of the power supply via the recharge component. The triggering event can also be based on user action, such as connection of the recharging interface in a user's shoe to the external power source. Moreover, the act of recharging the portable unit can occur during periods of non use of the portable device, as well as simultaneously with periods of active use of the device. Hence, a user need not deactivate the portable unit during the recharge intervals, by the recharge component.

Moreover, an artificial intelligence unit can supply inferences regarding which energy harvesting or scavenging methods should be applied to recharge the power supply, for example. Such inferences can be based on environmental factors (e.g., amount of sunlight), user activities, time of day, type of portable device and the like.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not be drawn to scale from one figure to another or within a given figure.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
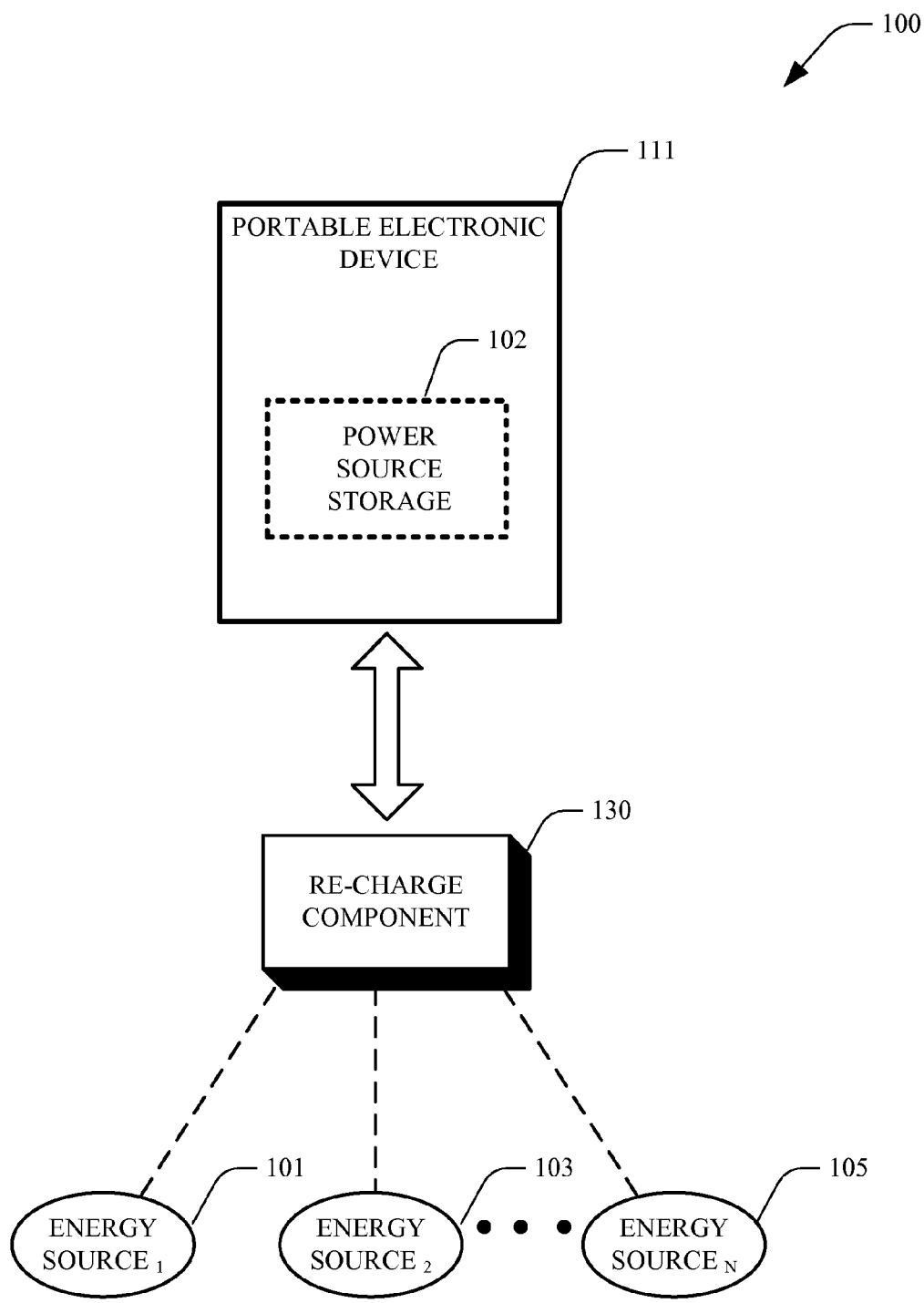
FIG. 1 illustrates an exemplary block diagram of a recharge component that employs energy harvesting and scavenging procedures, according to an aspect of the subject innovation.

FIG. 1 illustrates a schematic block diagram of a power management system 100 that employs energy harvesting and scavenging procedures to recharge a power supply or power source storage 102 of a portable unit 111, according to an aspect of the subject innovation. The recharge component 130 can leverage any of the energy sources 101, 103, 105 (1 to N, N being an integer) and employ scavenging techniques to provide power to the power source of the portable unit 111 based on a user's day-to-day activities. In one aspect, the energy sources 101, 103, 105 that supply energy harvesting can be distributed convenient locations on a body, which can serve as power redundancy as well as reduce the "peak current density" flowing through the body, as compared to a scenario wherein all the power has to come from one single power source.

The portable unit 111 can be any electronic device or intelligent unit such as personal computers, personal digital assistant, smart portable devices that can be carried by customers with computing and processing capabilities, mobile phones, digital music players and the like. Such portable unit 111 can host a power source storage 102 that can be recharged periodically via the recharge component 130. The power source storage 102 can include: rechargeable batteries Lithium-Ion battery, Nickel-Cadmium, Nickel-Metal-Hydride, Alkaline, Lithium Polymer), fuel cells, capacitors, high capacity capacitors, super capacitors and the like, or any other energy storage component capable of storing energy and releasing it as to create an electrical current, for example. Moreover, the recharge component 130 can recharge power source storage 102 through direct electrical contact (e.g. wiring) and/or via a non-direct electrical association such as induction. It is to be appreciated that even though FIG. 1 illustrates the recharge component 130 as an entity separate from the power source storage 102 or the portable unit 111, such recharge component 130 can also be a part thereof. The energy sources 101, 103, 105 can include energy sources (e.g., potential energy, kinetic energy) that are available to a user in day-to-day activities. Such can include energy sources such as energy derived from muscle movement of a user, body heat, environmental factors (e.g., amount of light and heat available). Moreover, power outputs from all such sources can be controlled and closed loop safety mechanisms supplied to limit the current density flowing through the body as well as load balancing.

Figure 2:
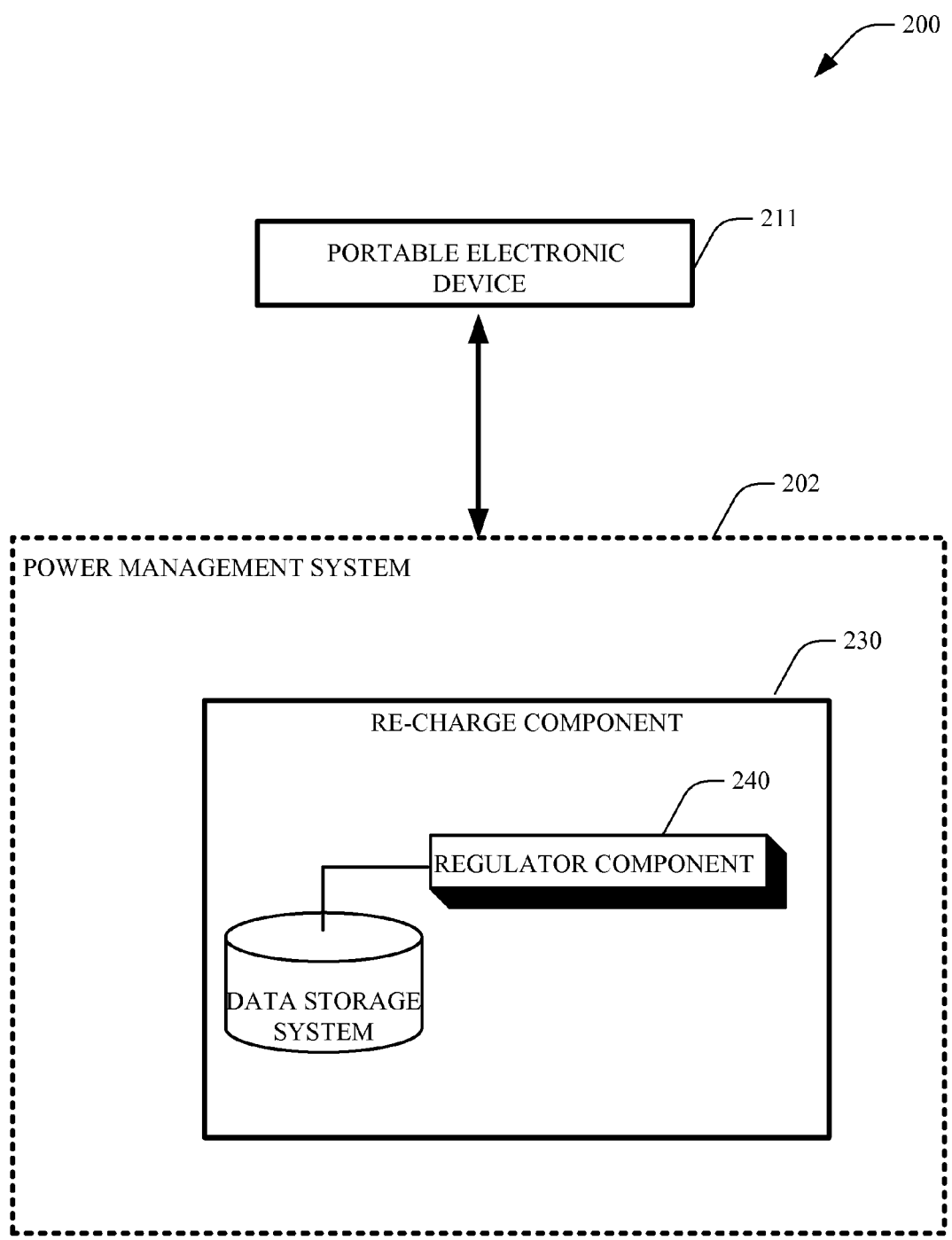
FIG. 2 illustrates a further power management system that can employ energy harvesting to recharge the portable electronic device.

FIG. 2 illustrates a further power management system 202 that can employ energy harvesting to recharge the portable electronic device 211. The recharge component 230 can further include a regulator component 240 that controls functions of the portable electronic device 211, to minimize a power consumption thereof. For example, the regulator component 240 can adjust size of a screen output, and further minimize usage of associated transceiver units when the battery power drops below a predetermined threshold. Accordingly, the subject innovation can further manage a supply of power to the portable electronic device 211 based on its state of operation, e.g., if power is low, the mobile device can halt a simultaneous display of multiple video feeds via a split screen—since such operation can become power intensive. Accordingly, the regulator component 240 can monitor state of charge of the portable unit and can notify its user of requirement for charging the portable unit based on its state of charge. The recharge component 230 can then initiate respective recharge processes based on energy scavenging processes based on notification from the regulator component 240. Such notification can be in a form of an electric stimulus, visual and/or auditory signal, or the like.

The regulator component 240 can also deactivate the power recharge of the portable electronic device 211 upon removal of the triggering event—which initiates the recharge—or after a predetermined interval. The regulator component 240 can also emit a notifying signal, e.g., a noise, light, or the like, to indicate when power recharge is activated based on detection of a triggering event. Such notifying signal can also be transmitted to a display of the portable electronic device 211, which is associated with the recharge component of the subject innovation. Moreover, the regulator component 240 can equalize state of charge in the portable electronic device 211 to avoid an overcharge, by providing or blockage for further charging current.

The power management system 202 can further include a view port (not shown) through which the user can view a light emitted from an internal light source. The light source can comprise LEDs (Light Emitting Diodes) associated for example with a particular status of the charge of power source and/or operation of the power management system 202. In addition, other auditory notification schemes can be employed with the charge status of the rechargeable battery. In a related aspect, the user can perceive the green light through the view port of a battery pack associated with the portable electronic device 211, if a successful charge has occurred and/or a green light may be displayed when battery is at a full state. Alternatively, if a recharge is unsuccessful, and/or when a low battery level is at a critically low level, the user can perceive a red light through the view port. Moreover, power depletion of the portable electronic (e.g., below a predetermined level) can also initiate a specific stimulus notifying a user (e.g., a specific LED color or auditory tone.) Moreover, the controlled confirmations provided by the LEDs and/or audio transducer can be activated in various combinations or singularly, at the discretion of the user.

Figure 3:
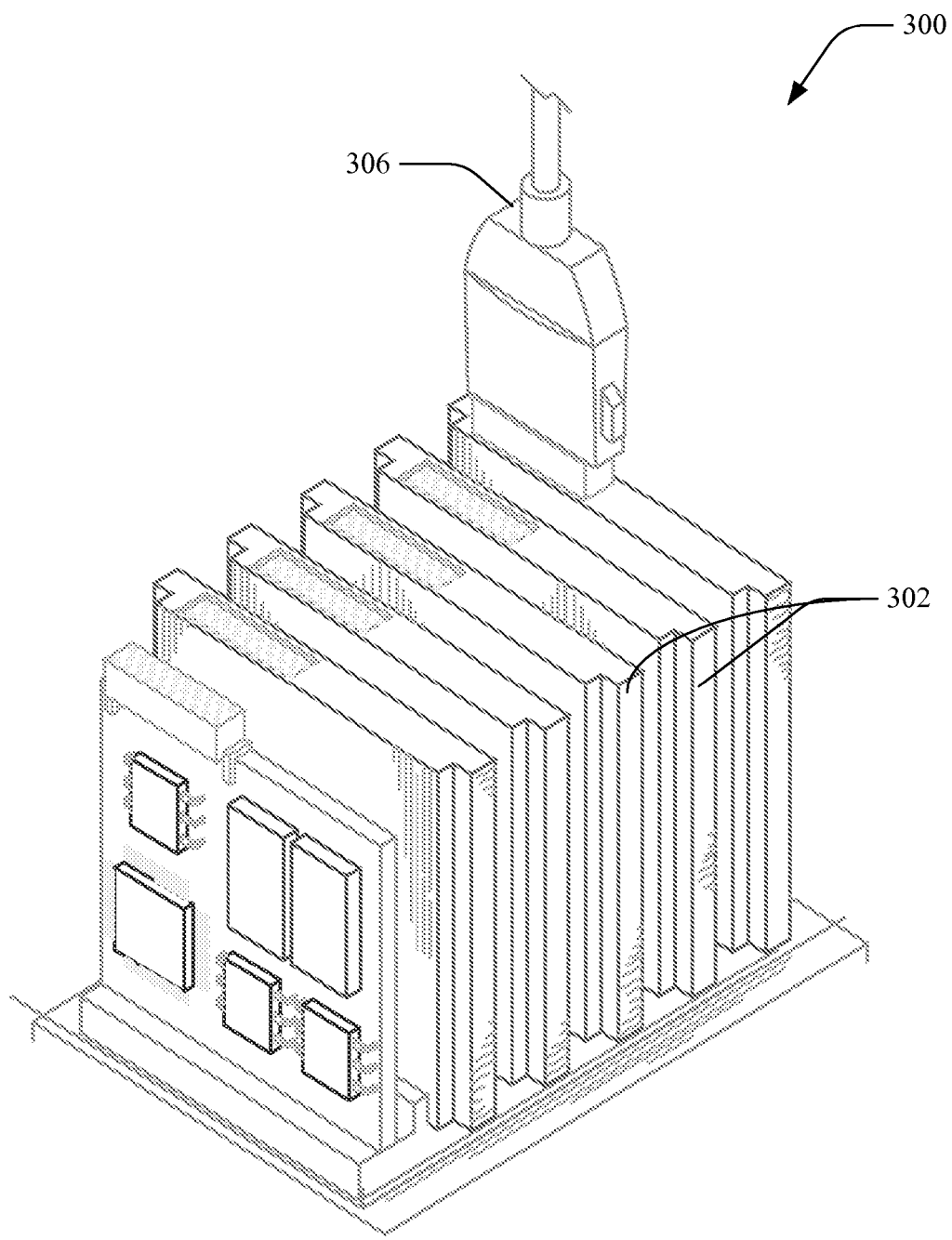
FIG. 3 illustrates a block diagram of a recharge component that implements a modular arrangement for energy scavenging procedures.

FIG. 3 illustrates a block diagram of a recharge component that implements a modular arrangement for energy scavenging procedures, and acquiring energy for the recharge of the portable mobile unit. Such modular arrangement can include a plurality of cards 302 grouped together (e.g., flash cards, memory cards, smart cards, flash memory devices, communication card, data acquisition circuitry and the like) as part of a package with an interconnect 306 to a sensor or energy collection component. By replacing, inserting, swapping a card, the modular component can be tailored to operate for acquisition of a particular source of energy. In a related aspect, the modular arrangement 300 for the recharge component can be tailored to acquire energy through an induction (e.g., "contact free") process, as described in detail infra.

Figure 4:
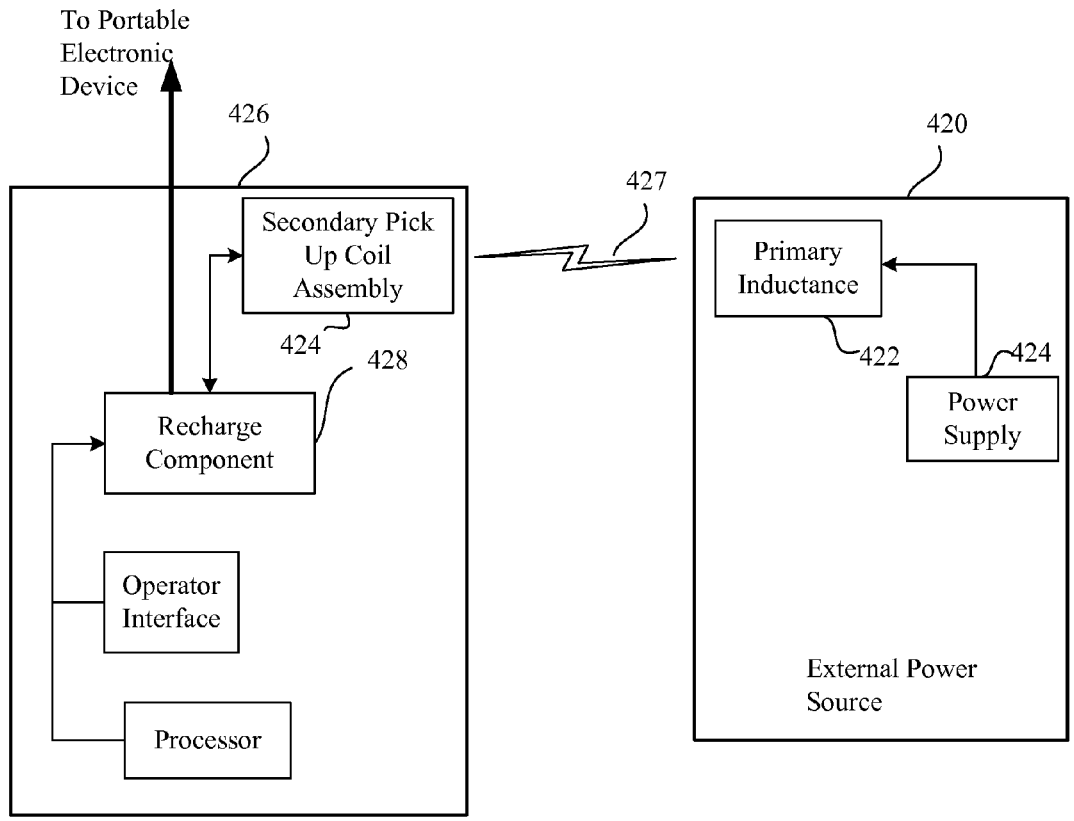
FIG. 4 illustrates a block diagram for a recharge component according to one exemplary aspect of the subject innovation.
Figure 5:
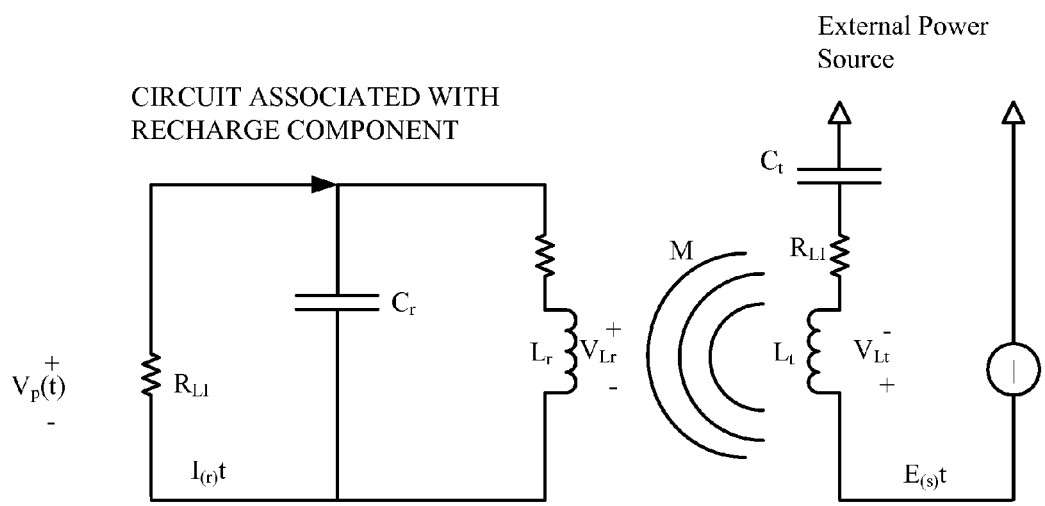
FIG. 5 illustrates a circuit diagram as part of a recharge component according to an aspect of the subject innovation.

FIG. 4 and FIG. 5 illustrate a block diagram and a circuit diagram for a recharge system according to one exemplary aspect of the subject innovation, which can further employ an external charger system. The external charger system 420 includes a controller 421 coupled to a primary inductance component 422 for inducing a magnetic flux 427 in a secondary coil assembly 424 associated with the recharge component 428. The transmitting network for the inductive coupling 427 between the primary assembly 422 and secondary assembly 424, can be a constant current drive circuit configuration as illustrated in FIG. 5. The primary inductance component 422 includes an induction assembly having a coil arrangement $L_t$. When coil arrangement $L_t$ in the induction assembly 422 is energized via the main power supply 424, the charged coil creates magnetic flux lines M, as illustrated in FIG. 5. The pick up secondary assembly 424 includes a secondary core, a winding element $L_r$ and a rectifier (not shown), operatively connected to the recharge component 428, to recharge the portable unit. Accordingly, recharge component 428 is in a non-direct electrical contact relationship with the primary induction assembly 422, which is associated with the external power source 426. The recharge component 428 with the pick up coil can have an electrical current $I_r(t)$ induced therein when the recharge component 428 is positioned in proximity to the external power source 420 with its coil arrangement energized by power supply 424. The recharge component 428 can further include a circuit arrangement for rectifying the induced current in the pick up coil to restore power within the recharge component 428, for subsequent transfer to the portable electronic device. Such circuit arrangement can include a rectifier (not shown) and a current limiting resistor, so that the recharge component is self regulating in terms of current and over charge. It is to be appreciated that such an induction arrangement can also be implemented between the recharge component and the electronic mobile unit.

The magnetic coupling is enhanced between the inductive charge coupler 422 and the inductive charge receptacle 424 by the thinness, in the axial direction, of the electrical windings in both the coupler and receptacle. Moreover, the coils associated with the inductor 424 can be formed integrally with the recharge component 428. For example, the coils can be etched and/or plated, or in the alternative, the coil can be physically separate from the associated component. As explained earlier the system 426 can be wearable by a user (e.g., positioned in a belt or shoe of the user.)

Figure 6:
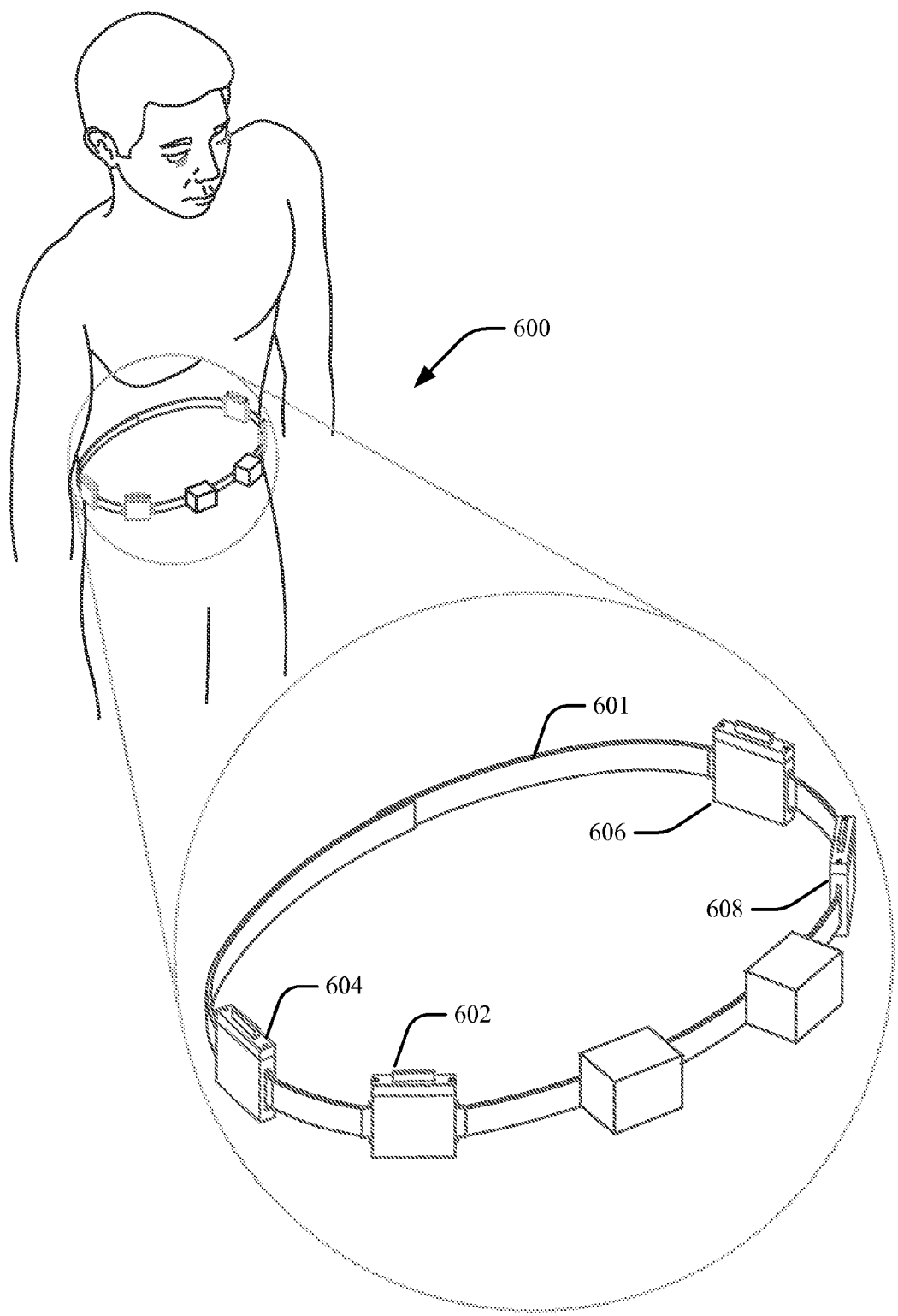
FIG. 6 illustrates a distributed recharging system that is spatially distributed along a common communication link, according to an aspect of the subject innovation.

For example, FIG. 6 illustrates a distributed recharging system 600 that is spatially distributed along a common communication link, such as a belt 601 around a user's body as illustrated in FIG. 6. Certain modular components 602-608 can thus be located proximate to predetermined portions of a user's body. Sensors or other units attached to various parts of a user's body can accumulate and/or convert mechanical energy to electric current for recharging the power supply via the recharge component of the subject innovation. Moreover, various configuration of wires (e.g., on a nano-scale) can supply a contact based interface from the recharge component to the power supply, for a continuous charge thereof. For example, a spreading assembly of piezoelectric elements can be employed at the sole of the shoe, to convert the applied stress/strain into electrical current. The piezoelectric elements can be fabricated from any piezoelectric material that can convert mechanical energy (e.g., shock force) into an electric field. Such material can for example include a variety of ceramics with a perovskite structure quartz, barium titanate, lead niobate, lead zirconate titanate, and the like. It is to be appreciated that various electronic circuitry and components can be embedded into the spreading assembly of the piezoelectric component in a variety of planar or three dimensional arrangements to gather, monitor, regulate and over all manage voltage or current formation therein.

In such a distributed control system, one or more I/O modules can further be provided for interfacing with a process of energy collection, wherein the outputs derive their control or output values in the form of a message from a master controller over a network or a backplane. For example, a modular component can receive an output value from a processor, via a communications network or a backplane communications bus. The desired output value for controlling a device associated with energy collection can be generally sent to the output module in a message, such as an I/O message. The modular component that receives such a message can provide a corresponding output (analog or digital) to the controlled process. The modular component can also measure a value of a process variable and report the input values to a master controller or peer modular component over a network or backplane. The input values may be used by the master processor for performing control computations, and management for the accumulation process.

Figure 7:
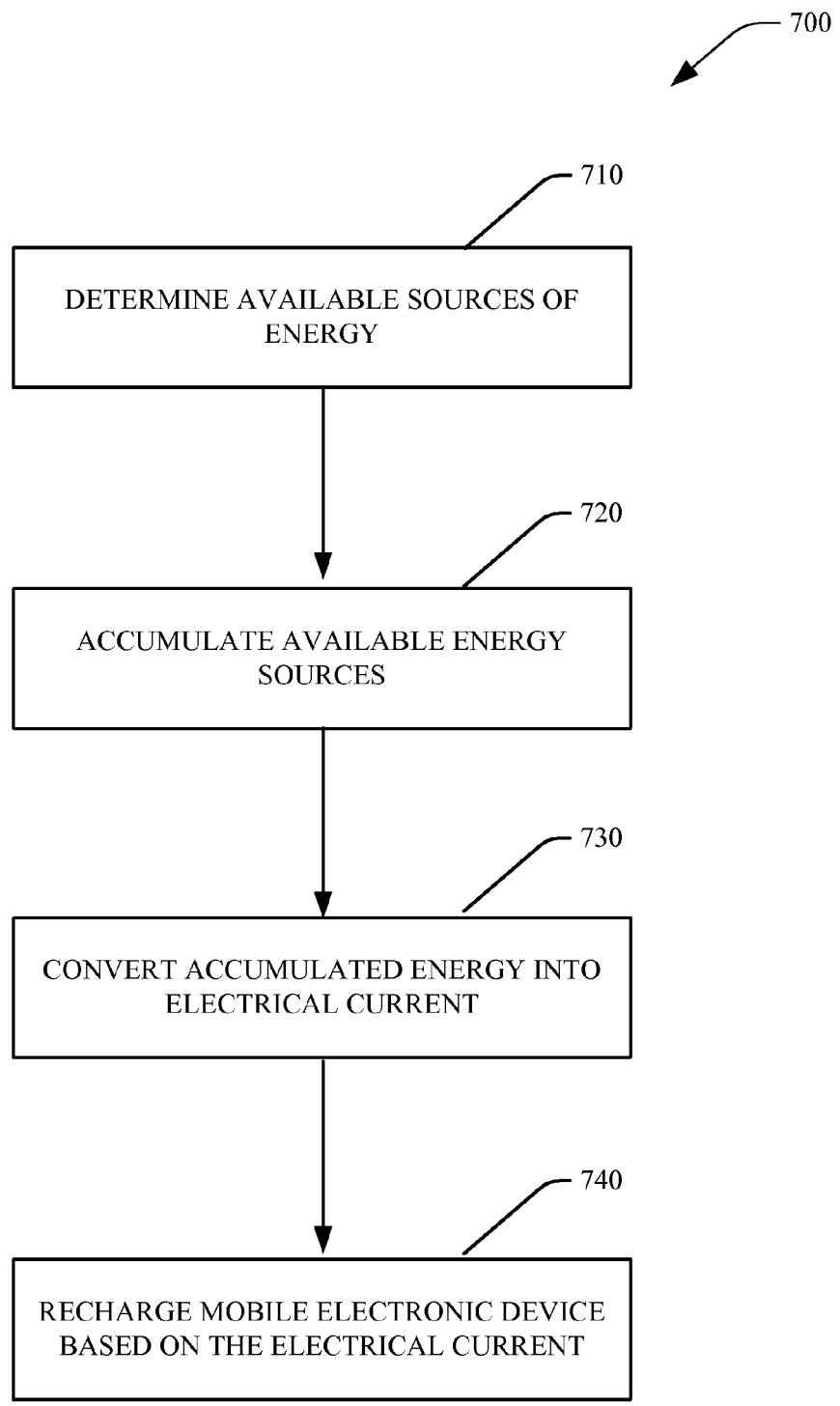
FIG. 7 illustrates a methodology of recharging a power supply for a portable electronic device through leveraging of energy harvesting or scavenging methodologies.

FIG. 7 illustrates a methodology of recharging a power supply for a portable electronic device through leveraging of energy harvesting or scavenging techniques associated with available energy sources to provide power based on a user's day-to-day activities. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 710, available sources of energy can be determined. Such can for example be based on user activity and environment wherein such activity occurs therein (e.g., determining amount of available light, muscle movement of the user and the like). Next, and at 720 the available energy sources can be accumulated to pool them into a source for subsequent recharge of the mobile electronic device. At 730 the accumulated energy from different sources can then be converted into electrical current—e.g., via employing piezoelectric components, nano-generators, and the like). Such nano-generators represent nanometer-scale generators that can produce continuous direct-current electricity by harvesting mechanical energy from such environmental sources as ultrasonic waves, mechanical vibration or blood flow. For example, the nano-generators take advantage of the unique coupled piezoelectric and semiconducting properties of zinc oxide nanostructures, which produce small electrical charges when they are flexed. The electrical current thus obtained can then be employed to recharge the power supply of the mobile electronic device at 740.

Figure 8:
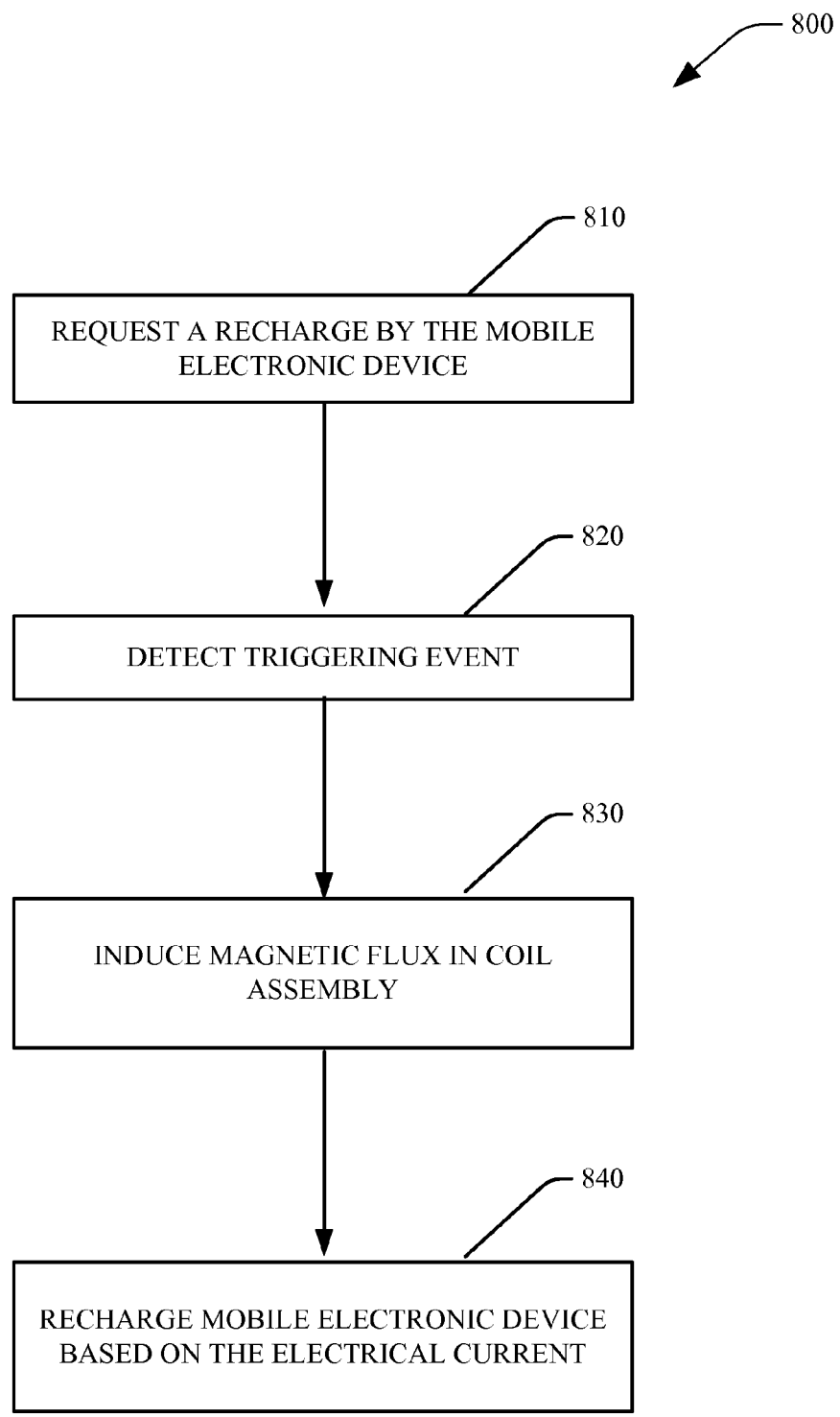
FIG. 8 illustrates a further methodology for charging an electronic unit via the recharge component according to an aspect of the subject innovation.

FIG. 8 illustrates a further methodology 800 for charging an electronic unit via the recharge component according to an aspect of the subject innovation. Initially, and at 810 a user of a mobile electronic device requests battery of a portable unit to be charged. Such request can for example be in response to a notification by the regulator component, or at a user's preference. At 820 a triggering event can then be detected to initiate the recharge process. Such triggering event can include, for example, occurrence of predetermined events or user actions such as of a waving a user's foot and shoe motion in front of a charging assembly. At 830 a magnetic flux can be induced in a coil assembly associated with the recharge component to supply a recharge for the mobile electronic device based on the electrical current at 840. For example, if the recharge component is positioned in a user's shoe, the magnetic flux can be introduced in the shoe while the user stands on a platform during a shoe shine, for example.

Figure 9:
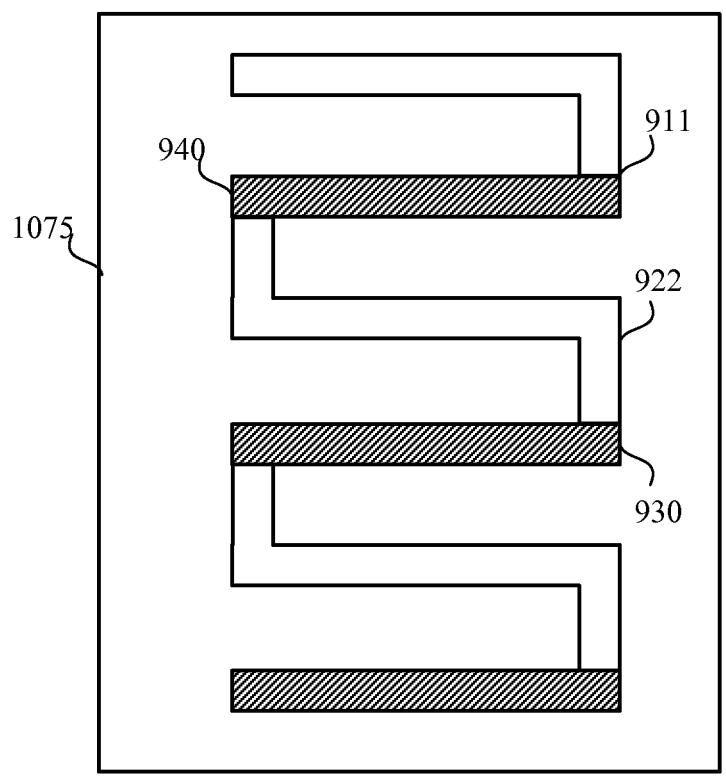
FIG. 9 and FIG. 10 illustrate a schematic top and side view of a thermo-coupling arrangement as part of energy harvesting and/or scavenging mode of the subject innovation.
Figure 10:
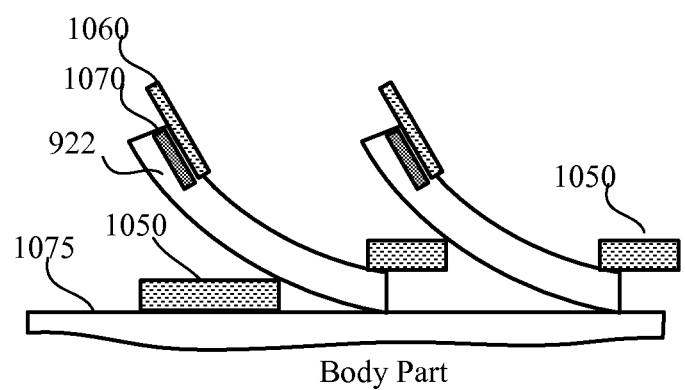

FIG. 9 and FIG. 10 illustrate a schematic top and side view of a thermo-coupling arrangement as part of energy harvesting and/or scavenging mode of the subject innovation. As illustrated, the thermopile comprises a series of thermocouples made from dissimilar metals 911 and 922, for example, copper/constantan (a copper/nickel alloy containing from 40 to 45% nickel, the balance being copper); silicon/germanium or nickel/chromium. Semiconductor materials can also be employed for such assembly. The thermocouples can be connected in series in a cascading or interleafing arrangement, as to minimize space and to permit the stacking of a plurality of thermocouples in a small space. Such arrangement also facilitates manufacture in a sheet format.

The thermocouples operate by maintaining a temperature differential between the hot and cold junctions 930 and 940, respectively, to represent an application of the Seebeck Effect. A thermal insulator 1050, of low thermal conductivity, e.g., in the form of a ceramic film or a ceramic foam can also be provided to retain the heat in the hot junction. In addition, a thermal conductor or a heat sink 1060, such as a foil of high thermal conductivity is also provided as shown in FIG. 10 to conduct heat away from the cold junction. This maximizes the temperature differential. When the heat conductor 1060 is also electrically conducting, an additional very thin electrically insulating film 1070 can be provided between the layer 1060 and the thermocouples 911, 922. Examples of useful thermal conducting foil materials include silver, copper and aluminum. A very thin electrically insulating film material 1075 is interposed between a user's warm body part and the heat receiving surface of the thermocouple (hot junction) 930, to prevent shorting and to provide protection from damaging the device. Such an arrangement can be employed for a scavenging mode and providing additional power to main power supply and/or power supply of the portable unit. Other methods via employment of MEMS technology can also be employed.

Figure 11:
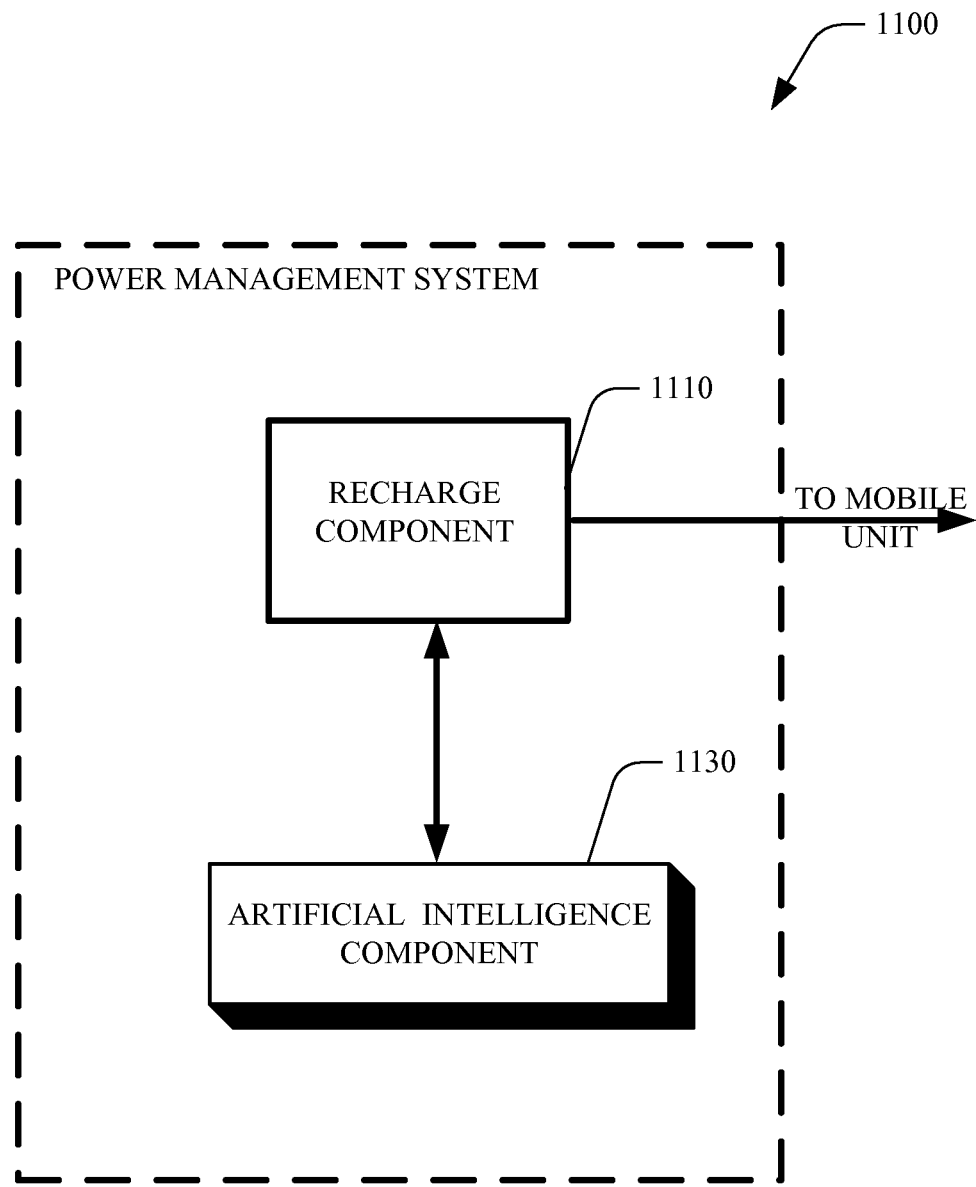
FIG. 11 illustrates a recharge component as part of a power management system of the subject innovation that further includes an artificial intelligence component.

FIG. 11 illustrates a recharge component as part of a power management system of the subject innovation that further includes an artificial intelligence component according to an aspect of the subject innovation. The subject innovation can employ various artificial intelligence based schemes for carrying out various aspects thereof. For example, a process for learning explicitly or implicitly what are sources of available for energy harvesting and/or when a recharge componet should initiate a charge of the mobile device, or should be charged itself can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Moreover, as used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component", "system", are intended to refer to a computer-related entity, either hardware, a combination of hardware and software, software, or software in execution and/or electromechanical units. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
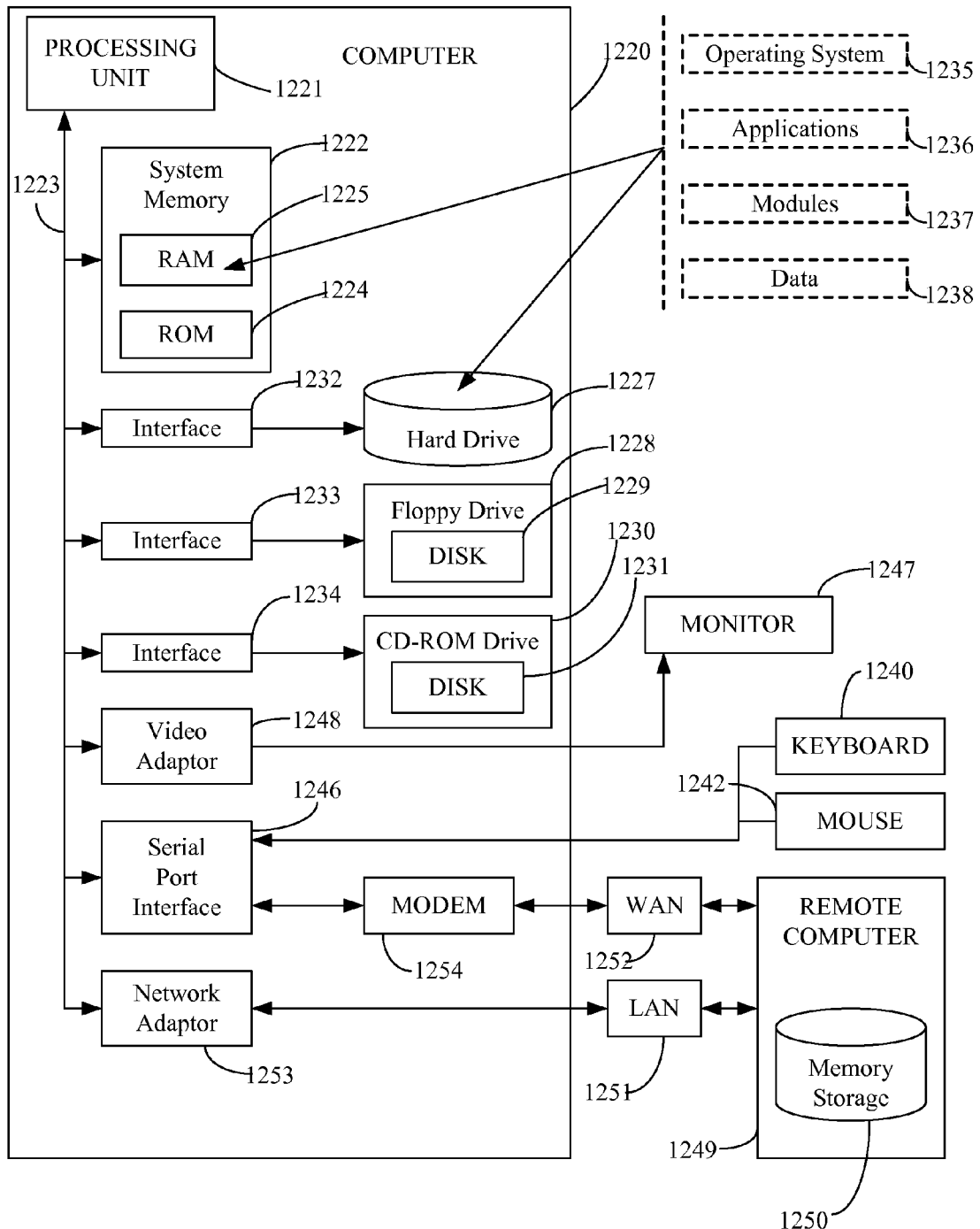
FIG. 12 an exemplary operating environment that can be implemented as part of, or in conjunction with the recharge component of the subject innovation.

FIG. 12 illustrates a brief, general description of a suitable computing environment that can be employed as part of, or in conjunction with the subject innovation. While some aspects of the innovation has been described above in the general context of computer-executable instructions of a computer program that runs on a computing unit and/or computers, those skilled in the art will recognize that the innovation can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the innovation can also be practiced in distributed computing environments where tasks are performed by remote processing devices that are linked through a communications network. However, some, if not all aspects of the innovation can be practiced on stand-alone computing units. In a distributed computing environment, program modules can be located in both local and remote memory storage devices. The exemplary environment includes a computing unit 1220, including a processing unit 1221, a system memory 1222, and a system bus 1223 that couples various system components including the system memory to the processing unit 1221. The processing unit 1221 can be any of various commercially available processors. Dual microprocessors and other multi-processor architectures also can be used as the processing unit 1221.

The system bus can be any of several types of bus structure including a USB, 1394, a peripheral bus, and a local bus using any of a variety of commercially available bus architectures. The system memory may include read only memory (ROM) 1224 and random access memory (RAM) 1225. A basic input/output system (BIOS), containing the basic routines that help to transfer information between elements within the computing unit 1220, such as during start-up, is stored in ROM 1224.

The computing unit 1220 further includes a hard disk drive 1227, a magnetic disk drive 1228, e.g., to read from or write to a removable disk 1229, and an optical disk drive 1230, e.g., for reading from or writing to a CD-ROM disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions, etc. for the computing unit 1220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject innovation. A number of program modules can be stored in the drives and RAM 1225, including an operating system 1235, one or more application programs 1236, other program modules 1237, and program data 1238. The operating system 1235 in the illustrated computing unit can be substantially any commercially available operating system.

A user can enter commands and information into the computing unit 1220 through a keyboard 1240 and a pointing device, such as a mouse 1242. Other input devices (not shown) can include a microphone, a joystick, a game pad, a satellite dish, a scanner, or the like. These and other input devices are often connected to the processing unit 1221 through a serial port interface 1246 that is coupled to the system bus, but may be connected by other interfaces, such as a parallel port, a game port or a universal serial bus (USB). A monitor 1247 or other type of display device is also connected to the system bus 1223 via an interface, such as a video adapter 1248. In addition to the monitor, computers typically include other peripheral output devices (not shown), such as speakers and printers.

The computing unit 1220 can operate in a networked environment using logical connections to one or more remote computers, such as a remote computing unit 1249. The remote computing unit 1249 may be a workstation, a server computer, a router, a peer device or other common network node, and typically includes many or all of the elements described relative to the computing unit 1220, although only a memory storage device 1250 is illustrated in FIG. 12. The logical connections depicted in FIG. 12 may include a local area network (LAN) 1251 and a wide area network (WAN) 1252. Such networking environments are commonplace in offices, enterprise-wide computer networks, Intranets and the Internet.

When employed in a LAN networking environment, the computing unit 1220 can be connected to the local network 1251 through a network interface or adapter 1253. When utilized in a WAN networking environment, the computing unit 1220 generally can include a modem 1254, and/or is connected to a communications server on the LAN, and/or has other means for establishing communications over the wide area network 1252, such as the Internet. The modem 1254, which can be internal or external, can be connected to the system bus 1223 via the serial port interface 1246. In a networked environment, program modules depicted relative to the computing unit 1220, or portions thereof, can be stored in the remote memory storage device. It will be appreciated that the network connections shown are exemplary and other means of establishing a communications link between the computing units can be employed.

Although the innovation has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. Furthermore, to the extent that the terms "includes", "including", "has", "having", and variants thereof are used in either the detailed description or the claims, these terms are intended to be inclusive in a manner similar to the term "comprising."

What is claimed is:

1. A system, comprising:
   a recharge component configured to harvest energy from a plurality of different types of energy resources, including:
     a muscle movement sensor configured to attach to a part of a human body and generate mechanical energy as a function of muscle movement of the human body,
     a thermal unit configured to attach to the part or another part of the human body and generate thermal energy as a function of body heat of the human body,
     a solar unit configured to generate solar energy as a function of an amount of sunlight received by the solar unit, and
     a kinetic unit configured to generate kinetic energy as a function of mechanical vibration of the kinetic unit; and
   an artificial intelligence component configured to determine a type of energy source of the plurality of different types of energy sources from which to harvest the energy based on at least one of a user activity, the amount of sunlight, or a time of day.

2. The system of claim 1, further comprising a contact free induction system configured to connect the recharge component to a mobile electronic device having an external power supply and wirelessly supply an electrical current to the external power supply.

3. The system of claim 1, wherein the muscle movement sensor employs a piezoelectric component to convert the mechanical energy to an electrical current.

4. The system of claim 3, wherein the piezoelectric component includes a spreading assembly of piezoelectric elements that are adapted to be positioned in a shoe.

5. The system of claim 1, wherein the artificial intelligence component is further configured to determine a first type of energy source of the plurality of different types of energy sources from which to harvest the energy based in part on availability of the first type of energy source and unavailability of a second type of energy source of the plurality of different types of energy sources.

6. The system of claim 5, wherein the artificial intelligence component employ statistical analysis to determine the first type of energy source of the plurality of different types of energy sources from which to harvest the energy.

7. The system of claim 1, wherein the plurality of different types of energy resources further includes an external induction unit configured to wirelessly transmit induction energy to the recharge component.

8. The system of claim 1, wherein the recharge component comprises a modular arrangement of a plurality of cards that are interchangeable based on the plurality of different types of energy sources, wherein respective ones of the plurality of cards facilitate the harvest of the energy from the plurality of different types of energy sources.

9. The system of claim 8, wherein the plurality of cards includes at least one of a flash card, a smart card, or a communication card.

10. The system of claim 1, wherein the muscle movement sensor employs a nano-generator to convert the mechanical energy to an electrical current.

11. The system of claim 2, further comprising:
   a regulator component configured to control a function of the mobile electronic device to reduce consumption of the electrical current.

12. The system of claim 1, wherein the plurality of different types of energy resources further includes a unit configured to generate kinetic energy as a function of blood flow of the human body.

13. A method, comprising:
   harvesting energy generated from a plurality of different types of energy sources, including:
     determining a type of energy source of the plurality of different types of energy sources from which to harvest the energy based on at least one of a user activity or a time of day;
     receiving mechanical energy at the muscle movement sensor in response to a muscle movement of the human body;
     receiving thermal energy at a thermal unit configured to attach to the human body;
     receiving solar energy at a solar unit as a function of an amount of sunlight received by the solar unit;
     receiving kinetic energy at a kinetic unit as a function of mechanical vibration of the kinetic unit;
     converting the mechanical energy, the thermal energy, the solar energy and the kinetic energy to an electrical current; and
     supplying the electrical current to a mobile electronic device.

14. The method of claim 13, wherein the supplying comprises wirelessly supplying the electrical current to the mobile electronic device using induction.

15. The method of claim 13, further comprising detecting a trigger that initiates the harvesting.

16. The method of claim 13, wherein the converting includes converting the mechanical energy to the electrical current with a piezoelectric component.

17. The method of claim 13, further comprising:
   regulating a function of the mobile electronic device to reduce consumption of the electrical current.

18. A system, comprising:
   means for accumulating energy from a plurality of different types of energy sources, the energy including:
     mechanical energy received at a muscle movement sensor configured to attach to a part of a human body and generate mechanical energy as a function of muscle movement of the human body,
     thermal energy received at a thermal unit configured to attach to the part or another part of the human body and generate thermal energy as a function of body heat of the human body;
     solar energy received at a solar unit, and
     kinetic energy received at a kinetic unit;
   means for determining a type of energy source of the plurality of different types of energy sources from which to accumulate the energy based on at least one of a user activity or an amount of sunlight determined to be available;

means for converting the mechanical energy, the thermal energy, the solar energy and the kinetic energy to an electrical current;

means for supplying the electrical current to an electronic mobile device; and means for regulating a function of the electronic mobile device to reduce a power consumption of the electronic mobile device.

19. The system of claim 18, wherein the means for supplying includes means for wirelessly supplying the energy to the electronic mobile device using induction.

20. The system of claim 18, wherein the means for accumulating includes means for accumulating electrical energy from an inductance component remote from the mobile electronic device.

21. A system, comprising:
a power storage component configured to store energy at least partly received based on an electrical current input to the power storage component and provide at least some of the energy to a mobile device; and
a recharge component configured to determine one or more energy resources from a plurality of different types of energy resources remote from the mobile device that are available to provide at least a portion of the energy to the power storage component based on at least one of an amount of sunlight determined to be available, user activity, or a time of day, and interact with the one or more energy resources to supply at least the portion of the energy to the power storage component,
wherein interaction with the one or more energy resources includes: reception of mechanical energy by a muscle movement sensor configured to attach to a part of a human body and generate mechanical energy as a function of muscle movement of the human body,
reception of thermal energy by a thermal unit configured to attach to the part or another part of the human body and generate thermal energy as a function of body heat of the human body,
reception of solar energy at a solar unit configured to generate solar energy as a function of sunlight received by the solar unit, and reception of kinetic energy at a kinetic unit configured to generate kinetic energy as a function of mechanical vibration of the kinetic unit, and
conversion of the mechanical energy, the thermal energy, the solar energy and the kinetic energy to the electrical current.

22. The system of claim 21, wherein the mobile device is separate from the recharge component.

23. The system of claim 21, wherein the recharge component is wired to the power storage component in order to supply at least the portion of the energy to the power storage component.

24. The system of claim 21, wherein the muscle movement sensor employs a piezoelectric component to convert the mechanical energy to the electrical current.

25. The system of claim 21, wherein the muscle movement sensor employs a nano-generator to convert the mechanical energy to the electrical current.

26. The system of claim 21, wherein the plurality of different types of energy resources further includes an induction system configured to generate induction energy, the induction system including a primary inductance component and a secondary inductance component, wherein the primary inductance component is connected to an external power supply and the secondary inductance component is associated with the recharge component, and wherein the secondary inductance component is energized in response to being positioned proximate to the primary inductance component.

27. The system of claim 26, wherein the secondary inductance component is configured for attachment to the part or the other part of the human body.

28. The system of claim 26, wherein the power storage component further includes a tertiary inductance component configured to supply an interface from the recharge component to the power storage component without contacting the power storage component.

29. A method, comprising:
determining whether at least a subset of a plurality of different types of external energy resources are capable of providing energy for a mobile device based on at least one of a user activity an amount of sunlight determined to be available, user activity, or a time of day, including:
determining whether a muscle movement sensor configured to attach to the human body is capable of generating mechanical energy as a function of muscle movement of the human body:
determining whether a thermal unit configured to attach to the part or another part of the human body is capable of generating thermal energy as a function of body heat of the human body:
determining whether a solar unit is capable of generating solar energy as a function of the amount of sunlight determined to be available, and
determining whether a kinetic unit is capable of generating kinetic energy as a function of mechanical vibration of the kinetic unit;
accumulating the energy from at least the subset of the plurality of different types of external energy resources; and
recharging a power supply of the mobile device based on the accumulating.

30. The method of claim 29, wherein the determining includes determining whether at least the subset of the plurality of different types of external energy resources are capable of providing the energy generated from at least one of: a change in temperature of an external body, a mechanical vibration, an ultrasonic wave motion, an environmental activity, or a heating of an object.

31. The method of claim 29, wherein the determining includes determining whether at least the subset of the plurality of different types of external energy resources are capable of providing the energy generated from an inductance assembly, wherein the inductance assembly includes a primary inductance component and a secondary inductance component, wherein the primary inductance component is connected to an external power supply, and wherein the secondary inductance component is energized in response to being positioned proximate to the primary inductance component.

32. The method of claim 31, wherein the accumulating includes accumulating the energy in response to the determining or in response to a trigger event.

33. A mobile device, comprising:
a power storage component configured to store at least a subset of energy for a mobile device based on an electrical current input to the power storage component, provide at least the subset of the energy to the mobile device, receive at least the subset of energy from a recharge component that determines a subset of energy resources from a plurality of different types of energy resources remote from the mobile device capable of providing at least the subset of energy to the power storage component, and interact with at least the subset of energy resources to provide at least the subset of the energy to the power storage component, and an artificial intelligence component configured to determine a type of energy source of the plurality of different types of energy sources from which to harvest the energy based on at least one of an amount of sunlight determined to be available, user activity, or a time of day, wherein the plurality of different types of energy resources includes: a muscle movement sensor configured to attach to a part of the human body, receive mechanical energy as a function of muscle movement of the human body, and convert the mechanical energy to part of the electrical current, a thermal unit configured to attach to the part or another part of the human body, receive thermal energy in response to body heat of the human body, and convert the thermal energy to another part of the electrical current, a solar unit configured to generate solar energy as a function of an amount of sunlight received by the solar unit, and a kinetic unit configured to generate kinetic energy as a function of mechanical vibration of the kinetic unit.

34. The mobile device of claim 33, wherein the power storage component is configured to receive at least a portion of the energy from the recharge component via inductive coupling.

35. The mobile device of claim 33, further comprising the recharge component.

36. The mobile device of claim 35, wherein the recharge component is configured to receive at least a portion of the energy from the one or more energy resources via inductive coupling.

37. The mobile device of claim 33, wherein the recharge component is separate from the power storage component.

* * * * *